(12) United States Patent
Saxena et al.

(10) Patent No.: US 9,626,653 B2
(45) Date of Patent: Apr. 18, 2017

(54) DOCUMENT DISTRIBUTION AND INTERACTION WITH DELEGATION OF SIGNATURE AUTHORITY

(71) Applicant: Adobe Systems Incorporated, San Jose, CA (US)

(72) Inventors: Neha Saxena, New Delhi (IN); Divij Kumar, New Delhi (IN); Aditya Kumar Pandey, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 34 days.

(21) Appl. No.: 14/859,944

(22) Filed: Sep. 21, 2015

(65) Prior Publication Data
US 2017/0083867 A1 Mar. 23, 2017

(51) Int. Cl.
| G06Q 90/00 | (2006.01) |
| G06Q 10/10 | (2012.01) |
| G06F 17/30 | (2006.01) |
| G06Q 50/18 | (2012.01) |

(52) U.S. Cl.
CPC ..... *G06Q 10/103* (2013.01); *G06F 17/30011* (2013.01)

(58) Field of Classification Search
None
See application file for complete search history.

(56) References Cited

U.S. PATENT DOCUMENTS

| 4,621,334 A | 11/1986 | Garcia |
| 4,805,222 A | 2/1989 | Young |
| 5,825,880 A | 10/1998 | Sudia et al. |
| 5,910,987 A | 6/1999 | Ginter et al. |
| 6,073,101 A | 6/2000 | Maes |
| 6,091,835 A | 7/2000 | Smithies et al. |
| 6,157,935 A | 12/2000 | Tran et al. |
| 6,240,091 B1 | 5/2001 | Ginzboorg et al. |
| 6,615,234 B1 | 9/2003 | Adamske et al. |

(Continued)

OTHER PUBLICATIONS

Craig Le Clair, "What to Look for in E-Signature Providers" (Nov. 15, 2011). Available at https://www.echosign.com/content/dam/echosign/docs/pdfs/Forrester_What_To_Look_For_In_E-Signature_Providers_Nov_2011.pdf.

(Continued)

*Primary Examiner* — Venkat Perungavoor
(74) *Attorney, Agent, or Firm* — Finch & Maloney PLLC

(57) ABSTRACT

Improved workflows allow delegation of authority to electronically sign a document according to a delegation rule. The delegation rule specifies a document criterion and a delegate who is authorized to sign documents meeting the criterion. The criterion may be based on subject matter, document originator, or receipt time. Delegation rules can also be invoked in response to specified conditions or events, such as receipt of an automated out-of-office notification, or failure to receive any response to a signature request within a certain time. When an electronic signature system processes a document meeting the specified criterion, or detects one of the specified conditions or events, the document is sent to the delegate for signature instead of the originally intended signatory. The workflow initiator and delegator are optionally notified of such delegation before the document is sent to the delegate, thus giving him/her a degree of control over the delegation.

19 Claims, 7 Drawing Sheets

(56) References Cited

U.S. PATENT DOCUMENTS

| | | | |
|---|---|---|---|
| 6,691,089 B1 | 2/2004 | Su et al. | |
| 6,928,421 B2 | 8/2005 | Craig et al. | |
| 6,959,382 B1 | 10/2005 | Kinnis et al. | |
| 7,206,938 B2 | 4/2007 | Bender | |
| 7,562,053 B2* | 7/2009 | Twining | G06F 21/64 705/80 |
| 7,581,109 B2 | 8/2009 | De Boursetty et al. | |
| 7,694,143 B2 | 4/2010 | Karimisetty et al. | |
| 7,779,355 B1 | 8/2010 | Erol et al. | |
| 7,895,166 B2 | 2/2011 | Foygel et al. | |
| 7,996,367 B2 | 8/2011 | Foygel et al. | |
| 7,996,439 B2 | 8/2011 | Foygel et al. | |
| 8,126,868 B1 | 2/2012 | Vincent | |
| 8,230,232 B2 | 7/2012 | Ahmed | |
| 8,234,494 B1 | 7/2012 | Bansal et al. | |
| 8,443,443 B2 | 5/2013 | Nordstrom | |
| 8,844,055 B2 | 9/2014 | Follis et al. | |
| 8,918,311 B1 | 12/2014 | Johnson et al. | |
| 8,930,308 B1 | 1/2015 | Johnson et al. | |
| 9,058,515 B1 | 6/2015 | Amtrup et al. | |
| 9,292,876 B1* | 3/2016 | Shimkus | H04L 9/3247 |
| 2001/0002485 A1* | 5/2001 | Bisbee | G06Q 20/00 713/167 |
| 2002/0038290 A1 | 3/2002 | Cochran et al. | |
| 2002/0062322 A1* | 5/2002 | Genghini | G06Q 30/06 715/234 |
| 2002/0091651 A1 | 7/2002 | Petrogiannis | |
| 2002/0095290 A1 | 7/2002 | Kahn et al. | |
| 2002/0103656 A1 | 8/2002 | Bahler et al. | |
| 2003/0009513 A1 | 1/2003 | Ludwig et al. | |
| 2003/0037004 A1 | 2/2003 | Buffum et al. | |
| 2003/0074216 A1 | 4/2003 | Salle | |
| 2003/0083906 A1 | 5/2003 | Howell et al. | |
| 2003/0154083 A1 | 8/2003 | Kobylevsky et al. | |
| 2003/0187671 A1 | 10/2003 | Kumhyr et al. | |
| 2003/0217275 A1 | 11/2003 | Bentley et al. | |
| 2004/0102959 A1 | 5/2004 | Estrin | |
| 2004/0139344 A1 | 7/2004 | Maurer | |
| 2004/0167847 A1 | 8/2004 | Nathan | |
| 2004/0187037 A1 | 9/2004 | Checco | |
| 2004/0204939 A1 | 10/2004 | Liu et al. | |
| 2004/0225887 A1 | 11/2004 | O'Neil et al. | |
| 2004/0243811 A1 | 12/2004 | Frisch et al. | |
| 2004/0264652 A1 | 12/2004 | Erhart et al. | |
| 2005/0228665 A1 | 10/2005 | Kobayashi | |
| 2005/0228999 A1 | 10/2005 | Jerdonek et al. | |
| 2005/0289345 A1 | 12/2005 | Haas et al. | |
| 2006/0020460 A1 | 1/2006 | Itou | |
| 2006/0041828 A1 | 2/2006 | King et al. | |
| 2006/0110011 A1 | 5/2006 | Cohen et al. | |
| 2006/0122880 A1* | 6/2006 | Franco | G06Q 30/0225 705/14.26 |
| 2006/0143462 A1 | 6/2006 | Jacobs | |
| 2006/0157559 A1 | 7/2006 | Levy et al. | |
| 2006/0212813 A1 | 9/2006 | Yalovsky et al. | |
| 2006/0253324 A1 | 11/2006 | Miller | |
| 2006/0280339 A1 | 12/2006 | Cho | |
| 2007/0055517 A1 | 3/2007 | Spector | |
| 2007/0113164 A1 | 5/2007 | Hansen et al. | |
| 2007/0124507 A1 | 5/2007 | Gurram et al. | |
| 2007/0143398 A1 | 6/2007 | Graham | |
| 2007/0220614 A1 | 9/2007 | Ellis et al. | |
| 2007/0226511 A1 | 9/2007 | Wei et al. | |
| 2008/0015883 A1 | 1/2008 | Hermann | |
| 2008/0177550 A1 | 7/2008 | Mumm et al. | |
| 2008/0180213 A1 | 7/2008 | Flax | |
| 2008/0195389 A1 | 8/2008 | Zhang et al. | |
| 2008/0209229 A1 | 8/2008 | Ramakrishnan | |
| 2009/0025087 A1* | 1/2009 | Peirson, Jr. | G06Q 10/00 726/27 |
| 2009/0062944 A1 | 3/2009 | Wood et al. | |
| 2009/0112767 A1 | 4/2009 | Hammad et al. | |
| 2009/0116703 A1 | 5/2009 | Schultz | |
| 2009/0117879 A1 | 5/2009 | Pawar et al. | |
| 2009/0177300 A1 | 7/2009 | Lee | |
| 2009/0222269 A1 | 9/2009 | Mori | |
| 2009/0228584 A1 | 9/2009 | Maes et al. | |
| 2009/0254345 A1 | 10/2009 | Fleizach et al. | |
| 2009/0260060 A1 | 10/2009 | Smith et al. | |
| 2009/0307744 A1 | 12/2009 | Nanda et al. | |
| 2009/0327735 A1 | 12/2009 | Feng et al. | |
| 2010/0131533 A1 | 5/2010 | Ortiz | |
| 2010/0161993 A1 | 6/2010 | Mayer | |
| 2010/0281254 A1 | 11/2010 | Carro | |
| 2010/0306670 A1 | 12/2010 | Quinn et al. | |
| 2011/0022940 A1 | 1/2011 | King et al. | |
| 2011/0047385 A1 | 2/2011 | Kleinberg | |
| 2011/0212717 A1 | 9/2011 | Rhoads et al. | |
| 2011/0225485 A1 | 9/2011 | Schnitt | |
| 2012/0072837 A1 | 3/2012 | Triola | |
| 2012/0190405 A1 | 7/2012 | Kumaran | |
| 2012/0254332 A1 | 10/2012 | Irvin | |
| 2013/0046645 A1 | 2/2013 | Grigg et al. | |
| 2013/0089300 A1 | 4/2013 | Soundararajan et al. | |
| 2013/0103723 A1 | 4/2013 | Hori | |
| 2013/0132091 A1 | 5/2013 | Skerpac | |
| 2013/0138438 A1 | 5/2013 | Bachtiger | |
| 2013/0166915 A1 | 6/2013 | Desai et al. | |
| 2013/0179171 A1 | 7/2013 | Howes | |
| 2013/0182002 A1 | 7/2013 | Macciola et al. | |
| 2013/0191287 A1 | 7/2013 | Gainer et al. | |
| 2013/0263283 A1* | 10/2013 | Peterson | G06F 21/6218 726/28 |
| 2013/0269013 A1 | 10/2013 | Parry et al. | |
| 2013/0283189 A1 | 10/2013 | Basso et al. | |
| 2013/0326225 A1 | 12/2013 | Murao | |
| 2013/0339358 A1 | 12/2013 | Huibers et al. | |
| 2014/0019761 A1 | 1/2014 | Shapiro | |
| 2014/0019843 A1 | 1/2014 | Schmidt | |
| 2014/0078544 A1 | 3/2014 | Motoyama et al. | |
| 2014/0079297 A1 | 3/2014 | Tadayon et al. | |
| 2014/0236978 A1 | 8/2014 | King et al. | |
| 2014/0279324 A1 | 9/2014 | King | |
| 2014/0282243 A1 | 9/2014 | Eye et al. | |
| 2014/0294302 A1 | 10/2014 | King et al. | |
| 2014/0343943 A1 | 11/2014 | Al-Telmissani | |
| 2014/0365281 A1 | 12/2014 | Onischuk | |
| 2014/0372115 A1 | 12/2014 | LeBeau et al. | |
| 2015/0012417 A1 | 1/2015 | Joao et al. | |
| 2015/0016661 A1 | 1/2015 | Lord | |
| 2015/0063714 A1 | 3/2015 | King et al. | |
| 2015/0073823 A1 | 3/2015 | Ladd et al. | |
| 2015/0100578 A1 | 4/2015 | Rosen et al. | |
| 2015/0127348 A1 | 5/2015 | Follis | |
| 2015/0172058 A1 | 6/2015 | Follis | |
| 2015/0294094 A1 | 10/2015 | Hefeeda | |
| 2016/0078869 A1 | 3/2016 | Syrdal et al. | |

OTHER PUBLICATIONS

U.S. Appl. No. 14/534,583, filed Nov. 6, 2014.
U.S. Appl. No. 14/551,560, filed Nov. 24, 2014.
U.S. Appl. No. 14/625,852, filed Feb. 19, 2015.
U.S. Appl. No. 14/840,380, filed Aug. 31, 2015.
EchoSign Jan. 2015 Release, retrieved from <https://www.echosign.adobe.com/content/dam/echosign/docs/pdfs/AdobeES_JanuaryRelease_WhatsNew.pdf> on Aug. 24, 2015.
Simske, Steven J. Dynamic Biometrics: The Case for a Real-Time Solution to the Problem of Access Control, Privacy and Security. 2009 First IEEE International Conference on Biometrics, Identiy and Security. Pub. Date: 2009. http://ieeexplore.ieee.org/stamp/stamp.jsp?tp=&arnumber=5507535.
Maeder, Anthony; Fookes, Clinton; Sridharan, Sridha. Gaze Based User Authentication for Personal Computer Applications. Proceedings of 2004 International Symposium on Intelligent Multimedia, Video and Speech Processing. Pub. Date: 2004. http://ieeexplore.ieee.org/stamp/stamp.jsp?tp=&arnumber=1434167.
Notice of Allowance received in U.S. Appl. No. 14/625,852 (sent Jul. 25, 2016).
Notice of Allowance received in U.S. Appl. No. 14/107,967 (sent Nov. 3, 2016) (6 pages).

(56) References Cited

OTHER PUBLICATIONS

Notice of Allowance received in U.S. Appl. No. 14/551,560 (sent Nov. 4, 2016) (19 pages).
Araújo et al., "User Authentication Through Typing Biometrics Features", IEEE Transactions on Signal Processing, vol. 53, No. 2, pp. 851-855 (2005).
Deng et al., "Keystroke Dynamics User Authentication Based on Gaussian Mixture Model and Deep Belief Nets", ISRN Signal Processing, vol. 2013, Article ID 565183, 7 pages (2013).
Moskovitch et al., "Identity Theft, Computers and Behavioral Biometrics", Proceedings of the 2009 IEEE International Conference on Intelligence and Security Informatics, pp. 155-160 (2009).

* cited by examiner

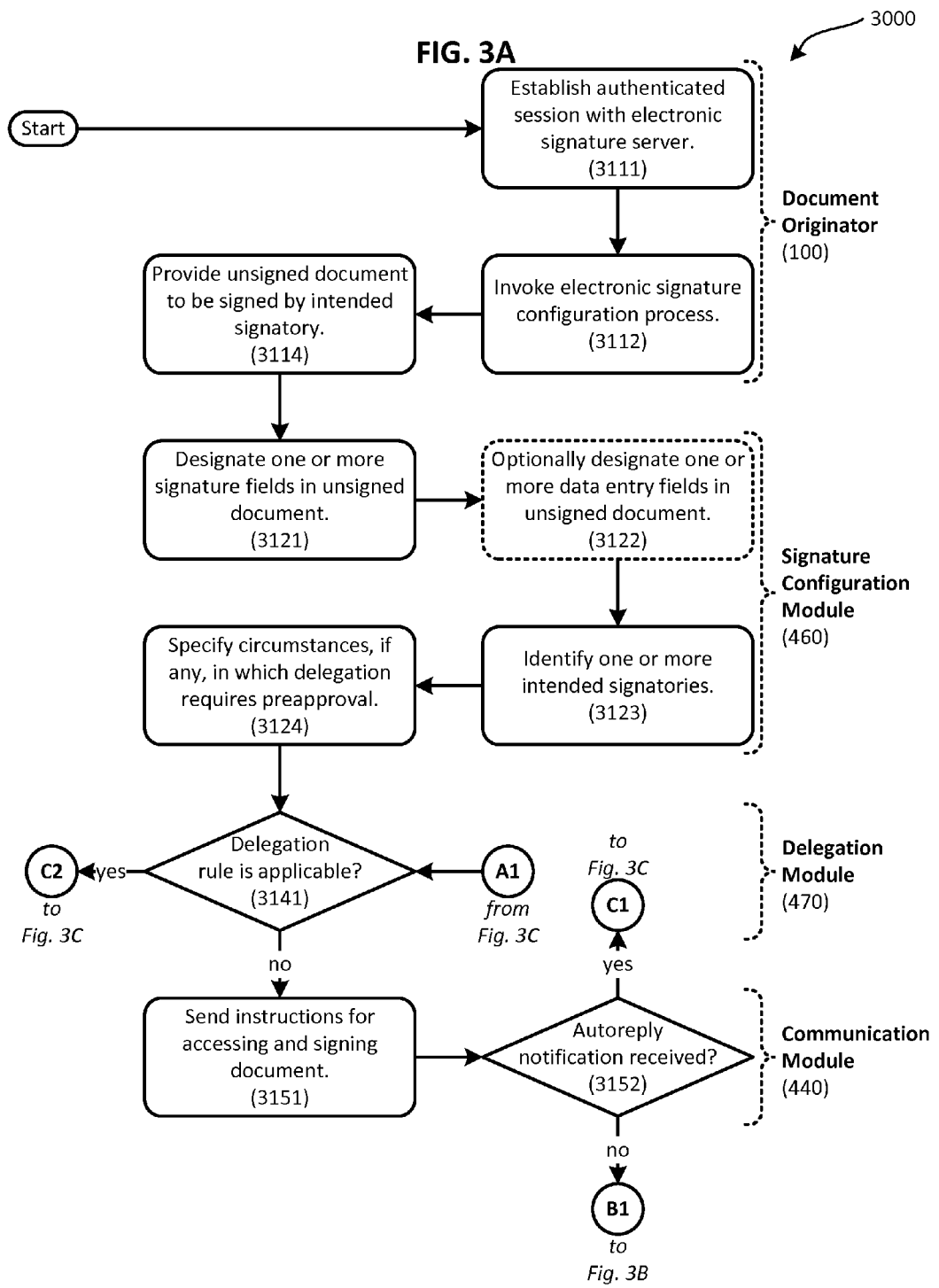

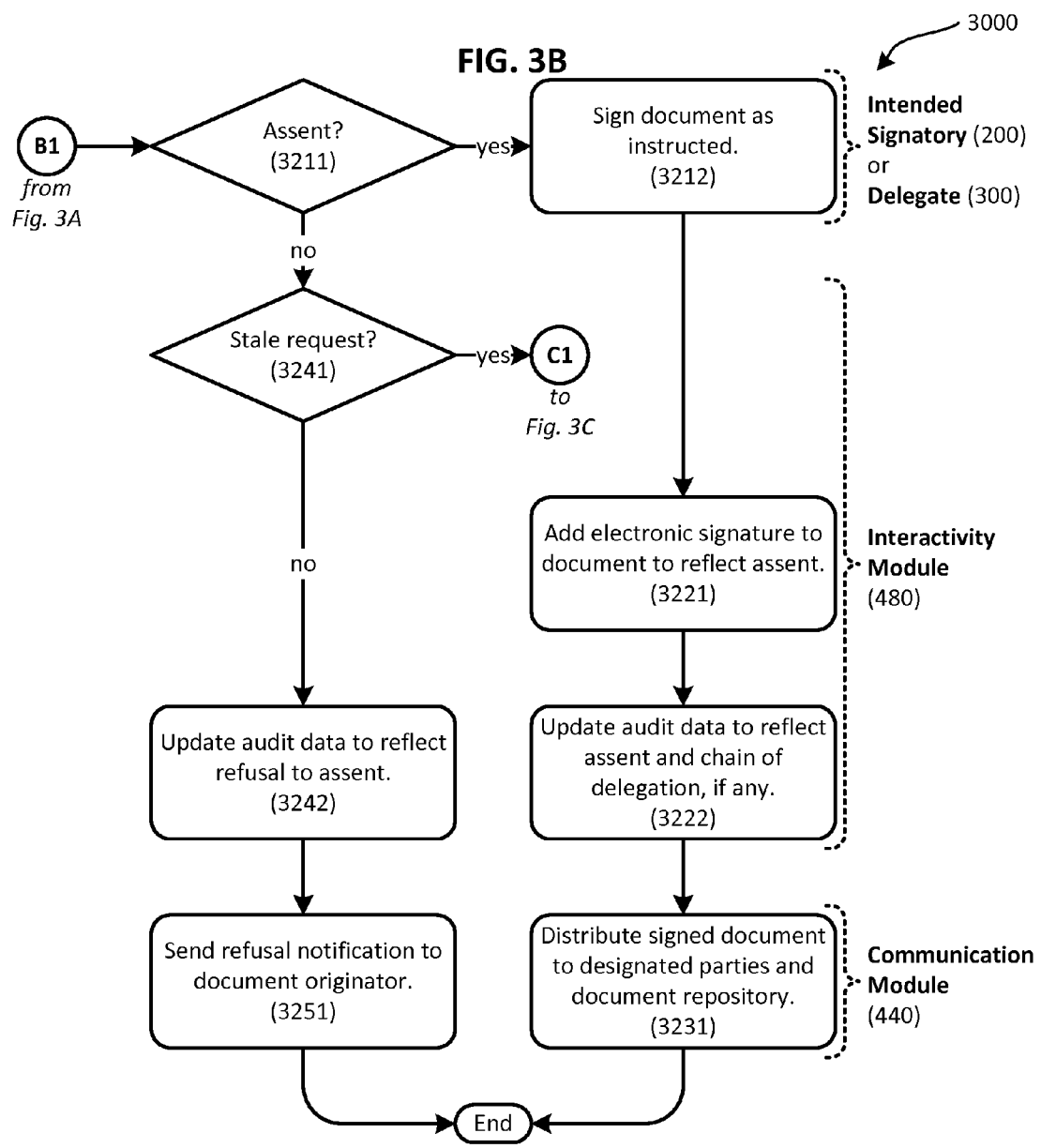

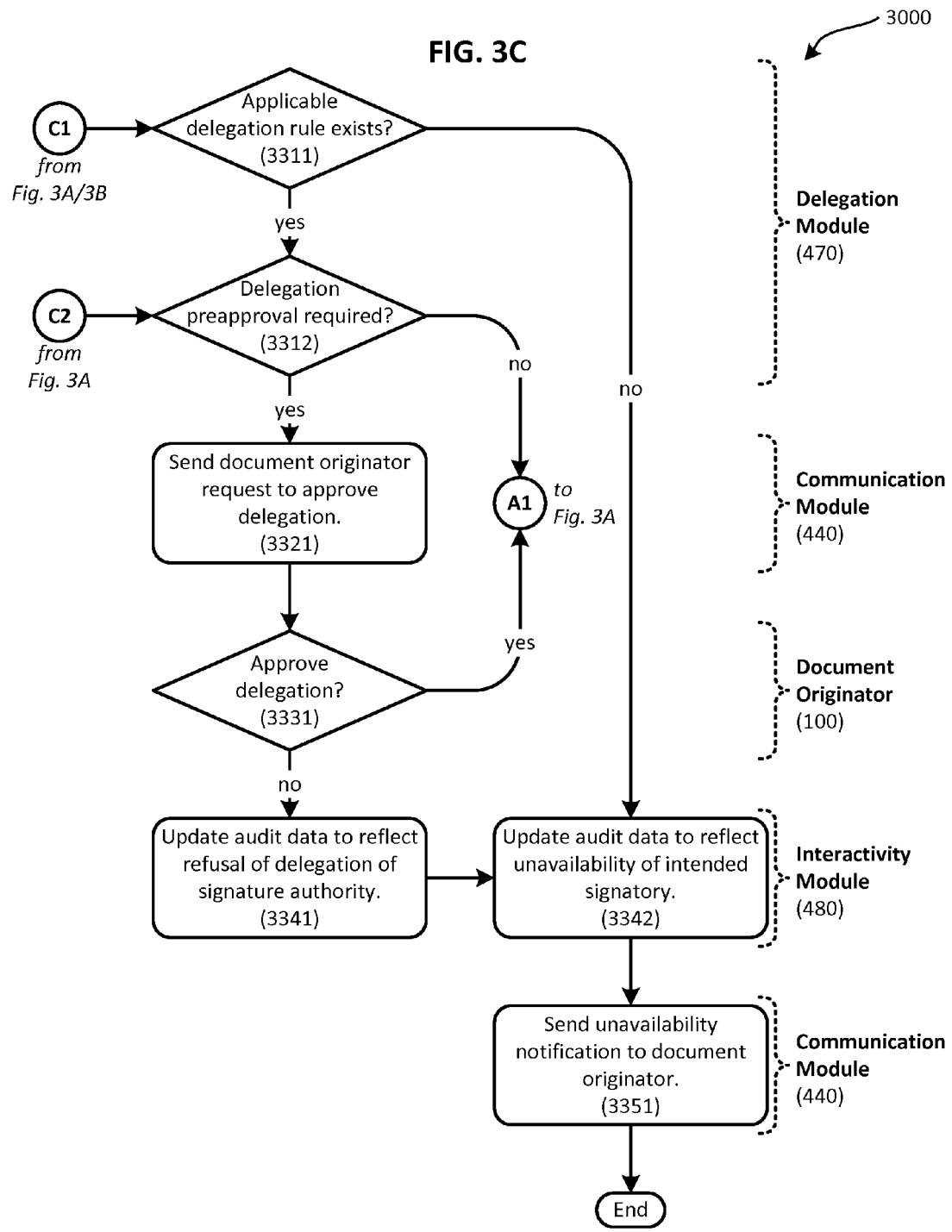

FIG. 4

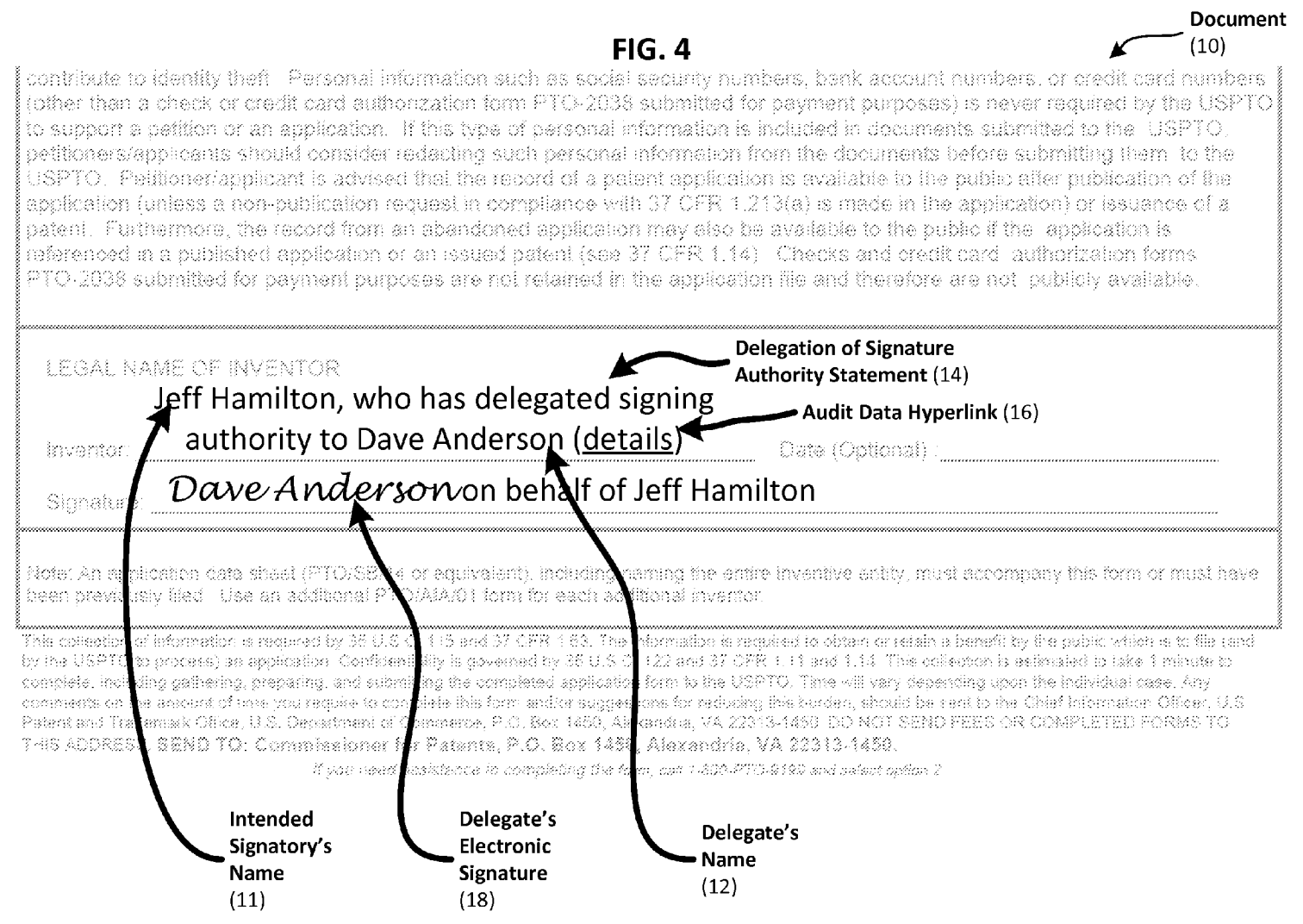

Document (10)

LEGAL NAME OF INVENTOR
Jeff Hamilton, who has delegated signing authority to Dave Anderson (details)

*Dave Anderson* on behalf of Jeff Hamilton

- Delegation of Signature Authority Statement (14)
- Audit Data Hyperlink (16)
- Intended Signatory's Name (11)
- Delegate's Name (12)
- Delegate's Electronic Signature (18)

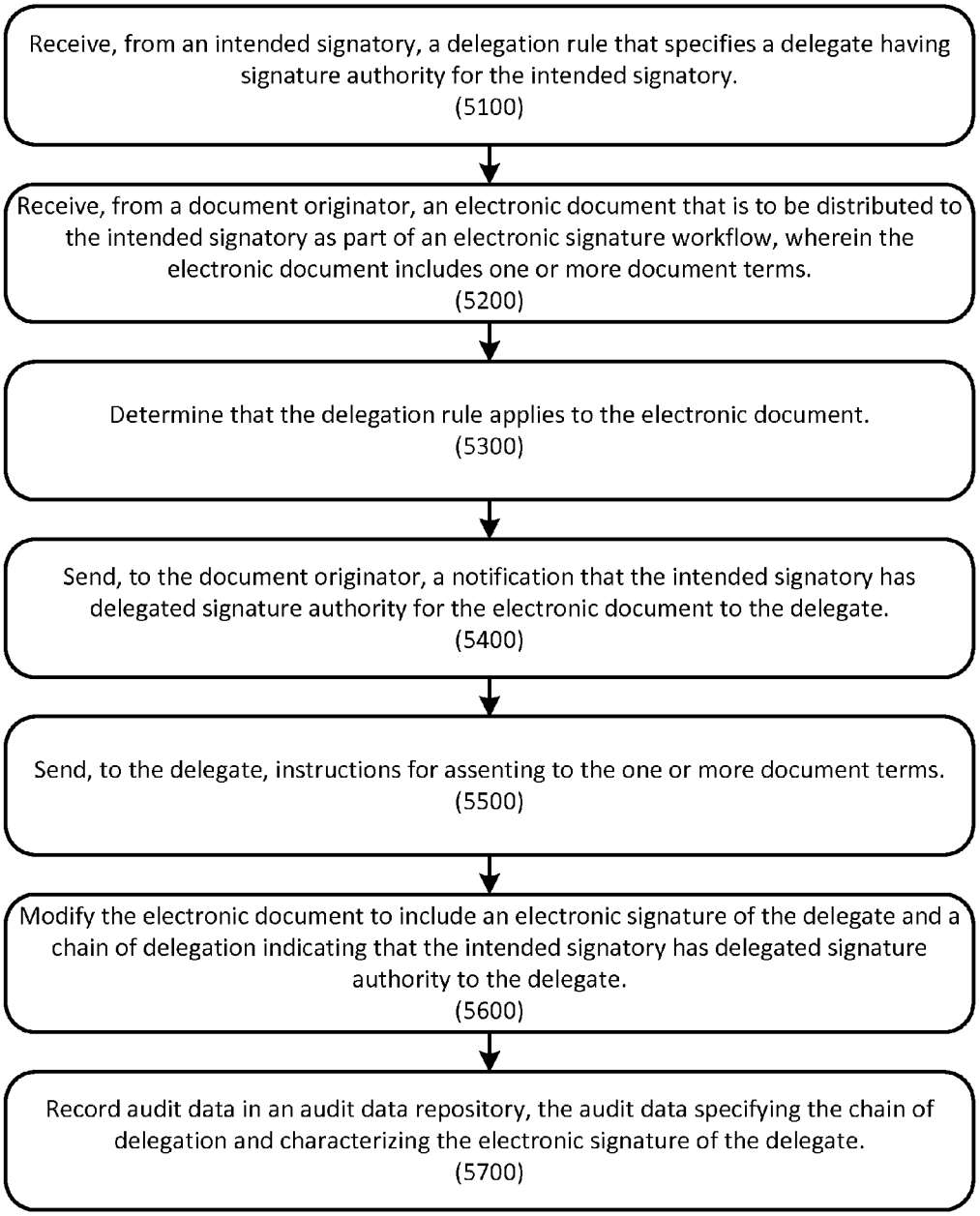

DOCUMENT DISTRIBUTION AND INTERACTION WITH DELEGATION OF SIGNATURE AUTHORITY

FIELD OF THE DISCLOSURE

This disclosure relates generally to document processing workflows, and more specifically to workflows that can be used to delegate authority to electronically sign a document according to established delegation rules.

BACKGROUND

Computers and electronic documents have become an increasingly indispensable part of modern life. In particular, as virtual storage containers for binary data, electronic documents have gained acceptance not only as a convenient replacement for conventional paper documents, but also as a useful way to store a wide variety of digital assets such as webpages, sound recordings, and videos. The increased use of electronic documents has resulted in the adaptation of conventional paper-based document processing workflows to the electronic realm. One such adaptation has been the increased use and acceptance of electronic signatures on agreements, contracts, and other documents. When negotiating parties reach an agreement with respect to a course of action, state of affairs, or other subject matter, the resulting agreement is usually reduced to writing and executed by the parties as a way to memorialize the terms of the agreement. Traditionally, a physical copy of the agreement was executed with a personalized stamp, seal, or handwritten signature. However, since this "reduction to writing" now often takes the form of an electronic document stored on a computer readable medium, electronic signatures have become commonplace and have indeed gained widespread legal recognition. See, for example, the Electronic Signatures in Global and National (ESIGN) Commerce Act, 15 U.S.C. §96. Even where an agreement is never actually reduced to writing, the resulting "oral contract" may still be enforceable if evidentiary questions as to the substance of the underlying agreement can be resolved. The wide variety of different formats and legal requirements relating to agreements has resulted in a correspondingly wide variety of workflows—both conventional and electronic—that facilitate the negotiation, formation, execution, fulfillment, and management of agreements, contracts, and other documents.

BRIEF DESCRIPTION OF THE DRAWINGS

FIGS. 3A through 3C comprise a flowchart illustrating an example method for soliciting an electronic signature in a workflow that is subject to a previously defined delegation rule.

FIG. 4 illustrates an example graphical representation of a document that has been signed by a delegate, and that includes a delegation of signature authority statement.

FIG. 5 is a flowchart illustrating an example computer-implemented electronic signature acquisition method.

DETAILED DESCRIPTION

Figure 1:
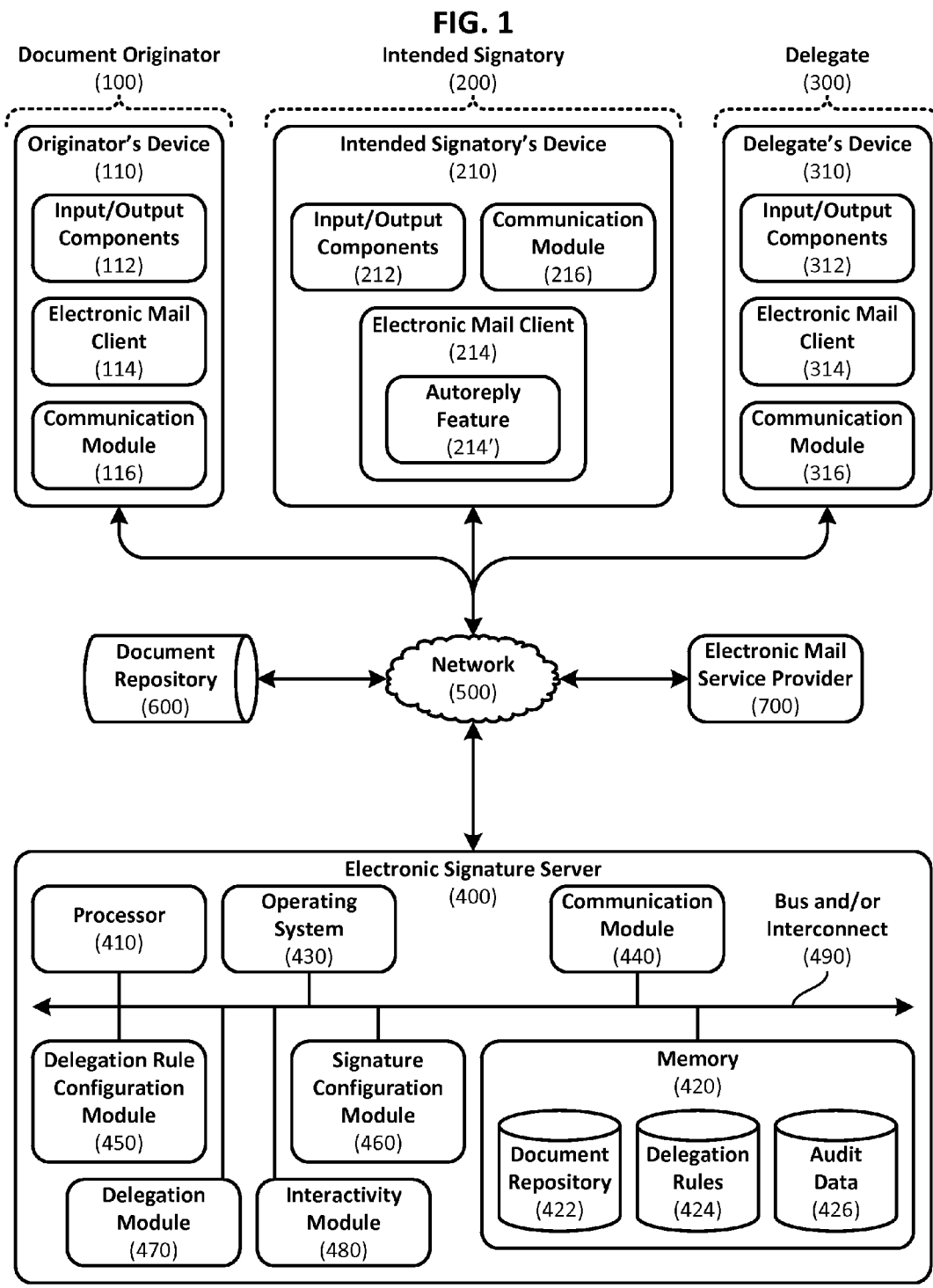
FIG. 1 is a block diagram illustrating selected components of an example computer system that can be used to delegate authority to electronically sign a document.

While many efficiencies and benefits have been derived from the implementation of workflows based on electronic signatures, such workflows still suffer from certain shortcomings and disadvantages. In particular, because of their automated nature, existing electronic signature workflows are not well-suited to detect and respond to events other than when a signatory signs or declines to sign an electronic document. For example, existing electronic signature workflows can stall if an intended signatory is nonresponsive, if an automated out-of-office notification is received in response to a signature request, or if other unanticipated conditions or events occur. This is because existing electronic signature workflows require the user who initiated the workflow to recognize such conditions and modify the workflow appropriately. Existing electronic signature workflows are not configured to alert the workflow initiator of such conditions, for example, by notifying him/her that an out-of-office notification was received from the intended signatory. Nor are existing systems configured to modify an electronic signature workflow in response to detecting such conditions. Because the workflow initiator can act only after recognizing that the workflow has stalled, existing electronic signature workflows are particularly susceptible to delays.

Moreover, even when the workflow initiator recognizes an unexpected condition or event that calls for the workflow to be modified, requiring him/her to adjust the workflow is suboptimal. It is often far more efficient for the intended signatory to make such adjustments. For example, in many cases it may be more appropriate for the intended signatory to designate a delegate having signature authority while the intended signatory is unavailable. This is because the intended signatory is often uniquely aware of factors such as who should sign a document in his/her absence, and which documents are suitable for execution by a delegate. Thus, even when an intended signatory's absence is planned in advance, existing electronic signature workflows lack the ability to establish delegation rules that are specifically tailored to certain time periods, document types, and other considerations, as defined by the intended signatory. This represents yet another substantial obstacle to the efficient implementation of electronic signature workflows that provide automated delegation of signature authority.

Thus, and in accordance with certain of the embodiments disclosed herein, improved workflows provide the ability to delegate authority to electronically sign a document according to established delegation rules. In one embodiment one or more delegation rules are defined. Each delegation rule specifies a delegate who is authorized to sign documents on behalf of an intended signatory. The delegation rule optionally specifies one or more document criteria which may be based, for example, on subject matter (for instance, all documents containing a particular keyword or all documents categorized into a certain category), document originator (for instance, all documents received from an identified user), or receipt time (for instance, all documents received in the next two weeks). Delegation rules can also be invoked in response to specified conditions or events, such as receipt of an automated out-of-office notification, or failure to receive any response to a signature request within a certain time. When an electronic signature system processes a document meeting the specified criteria, or detects one of the specified conditions or events, the document is sent to the delegate for signature instead of the originally intended signatory. The workflow initiator is optionally notified of such delegation before the document is sent to the delegate, thus giving him/her a degree of control over the delegation. The delegation of authority is optionally recorded in audit data maintained by the electronic signature system and/or memorialized in the signed document itself. Numerous alternative configurations and modifications will be apparent in light of this disclosure.

A wide range of benefits can be derived from certain of the embodiments disclosed herein. For example, electronic signature workflows that provide for automated delegation of signature authority based on predefined rules are less likely to stall when an intended signatory is unresponsive or unavailable. Such workflows can leverage existing notification frameworks, such as the automated out-of-office notification functionality that many electronic mail systems already provide. In addition, allowing more detailed delegation rules to be defined, for example by specifying different delegates for different documents, different time periods, and/or different document originators, gives users greater control over electronic signature workflows. Likewise, providing a workflow initiator with notice of the delegation before the document is actually sent to the delegate provides him/her with greater control over, or even preemption authority over, the delegation. While prior notice of delegation may be required by certain regulatory frameworks, existing electronic signature workflows lack the ability to provide such notice. In addition, memorializing the delegation in an audit record, and optionally in the signed document itself, clarifies the delegate's legal obligations and provides a more robust audit record. Certain of the delegation workflows disclosed herein can be implemented in both parallel signing workflows (that is, where a document is distributed to multiple signatories simultaneously and the signatories can sign in any order) and sequential signing workflows (that is, where a document is sequentially distributed to multiple recipients in a predefined order that establishes the signing order).

As used herein, the term "document" refers, in addition to its ordinary meaning, to any collection of information that can be communicated between users of the various systems disclosed herein. As used herein, the term "document terms" refers, in addition to its ordinary meaning, to content provided within, or accessible via, a document. A document can take the form of a physical object, such as one or more papers containing printed information, or in the case of an "electronic document", a computer readable medium containing digital data. Electronic documents can be rendered in a variety of different ways, such as via display on a screen, by printing using an output device, or aurally using an audio player and/or text-to-speech software. Thus, it will be appreciated that electronic documents may include digital assets in addition to or instead of text; such digital assets may include, for example, audio clips, video clips, photographs, and other multimedia assets. Documents may encompass a virtually unlimited range of subject matter, including documents that contain terms that are to be agreed to amongst various participants in a given workflow. Examples of such documents include agreements, settlements, and legally binding contracts. For instance, both a word processing file containing the terms of a legally enforceable contract as well as a compressed audio file containing an audio recording of the same contract terms would both be considered "documents" for the purposes of this disclosure. Such textual and audio components may be combined into a single "document" in certain embodiments. Documents may be communicated amongst users by a variety of techniques ranging from physically moving papers containing printed matter to wired and/or wireless transmission of digital data.

As used herein, the term "document originator" (or "originator") refers, in addition to its ordinary meaning, to a user or entity that represents the source of document in a workflow. A document originator may not necessarily be the creator, author, or generator of a particular document, but rather may simply be a user or entity that initiates a workflow by sending or otherwise providing a document to an electronic signature server or other recipient. The term document originator is not limited to people or users, but may also refer to entities, organizations, workstations, or computing devices which originate documents as part of a workflow. A given workflow may not necessarily involve the document itself being transmitted from the document originator; in some cases other data related to a document, such as metadata and/or a network address, may be transmitted instead.

As used herein, the term "delegator" refers, in addition to its ordinary meaning, to a user or entity that entrusts, appoints, provides, assigns, or otherwise delegates signing authority to a delegate. A delegator may also be referred to as an "intended signatory" since the document originator can generally be understood as having at least originally intended for the delegator to have signed the document. As used herein, the term "delegate" refers, in addition to its ordinary meaning, to a user or entity that has received signing authority from a delegator. Thus, in a generalized workflow, a document originator can be understood as sending a document to an intended signatory (delegator), who in turn delegates signature authority for the document to a delegate. In a more specific example workflow, a document originator initiates an electronic signature workflow wherein User A is an intended signatory on a document. User A delegates signature authority to User B. In response to such delegation, the document is sent to User B for signature. Here User A is the delegator, and User B is the delegate. In an alternative workflow, User B may delegate signing authority to User C. Here User A is still a delegator, User B is a delegate, an intended signatory, and a delegator, and User C is a delegate. Thus it will be appreciated that a single user or entity may act as both a delegator and delegate in different contexts. Both delegators and delegates may generally be referred to as "document recipients" since both will often receive a document from either a document originator or a delegator. In some applications, laws or regulations set forth formal criteria that must be satisfied to establish a legally enforceable delegation of authority from delegator to delegate. The terms delegator, intended signatory, and delegate are not limited to people or users, but may also refer to entities, organizations, workstations, or computing devices which interact with documents as part of a workflow. A given workflow may not necessarily involve the document itself being transmitted to a delegator or delegate; in some cases other data related to a document, such as metadata and/or a network address, may be transmitted instead.

As used herein, the term "electronic signature" refers, in addition to its ordinary meaning, to data that can be attached to, or logically associated with, an electronic document. Thus an electronic signature may comprise, for example, a string of characters, a digital key, a bitmap image such as an image of handwritten signature, an audio and/or visual recording of a person reciting a spoken phrase such as "I agree to these terms", a visual recording of a person performing a sequence of physical gestures, or any suitable combination of the foregoing. Electronic signatures may or may not be encrypted or otherwise encoded in a way that limits access and/or modification by unauthorized parties. An electronic signature may be personalized and associated with a particular individual, or may be generated automatically in response to a specified user input, such as the selection of an electronic checkbox, the checking of a button in a graphical user interface, or the generation of a touchtone using a telephone keypad. It will be appreciated than an electronic signature need not be incorporated into a particular electronic document, but may simply be stored in a resource managed by, for example, an electronic signature server, which can then create a logical association between the electronic signature and a particular electronic document. Where an electronic signature is encoded using binary digits, it may also be referred to as a "digital signature". Examples of products which provide services associated with an electronic signature server include Adobe Document Cloud (Adobe Systems Incorporated, San Jose, Calif.), and DocuSign eSignature (DocuSign, Inc., San Francisco, Calif.). An electronic signature is one manifestation of assent to the terms of a document.

System Architecture

FIG. 1 is a block diagram illustrating selected components of an example computer system that can be used to delegate authority to electronically sign a document. This computer system can be understood as enabling a document originator 100, an intended signatory 200, and a delegate 300 to interact with each other in a document processing workflow that is managed by an electronic signature server 400. In such embodiments, document originator 100, intended signatory 200, delegate 300, and electronic signature server 400 can communicate with each other via a network 500. Network 500 can also be used to access optional supplementary resources such as a networked document repository 600 and/or an electronic mail service provider 700, although additional or alternative resources may be provided in other embodiments. In some cases such supplementary resources are omitted, and the corresponding functionality associated with such resources is instead provided by one or more of document originator 100, intended signatory 200, delegate 300, or electronic signature server 400. Thus other embodiments may have fewer or more networked resources depending on the granularity of implementation. The various embodiments disclosed herein therefore are not limited to provision or exclusion of any particular resources.

As illustrated in FIG. 1, document originator 100, intended signatory 200, and delegate 300 each have access to a corresponding device 110, 210, 310 that facilities interaction with other users and components of the various systems described herein. Each of devices 110, 210, 310 may comprise one or more of a variety of suitable computing devices, such as handheld computers, cellular telephones, tablet computers, smartphones, laptop computers, desktop computers, and set-top boxes. Other devices or combinations of devices may be used in other embodiments. In general, device 110 enables document originator 100 to generate, modify, retrieve, and otherwise manipulate an electronic document, while devices 210, 310 enable intended signatory 200 and delegate 300 to receive, view, search, annotate, electronically sign, and otherwise interact with an electronic document.

Each of devices 110, 210, 310 includes input/output components 112, 212, 312, such as one or more of a keyboard, a touch sensitive display, a pointing device, and/or any other suitable input/output device. Each of devices 110, 210, 310 also optionally includes a wired and/or wireless communication module 116, 216, 316 that enables communication with other components via network 500. One or more electronic document collections can be stored in a storage resource associated with, or accessible via, devices 110, 210, 310, examples of which include an internal hard drive, integrated random access memory, a removable universal serial bus drive, and networked document repository 600. For example, in one particular implementation, one or more of devices 110, 210, 310 comprises a smartphone capable of connecting to other components via a cellular data connection. In general, devices 110, 210, 310 may include additional or alternative components as compared to those illustrated in FIG. 1, and it will be appreciated that the various embodiments disclosed herein are not limited to any particular configuration of devices 110, 210, 310.

In one embodiment electronic signature server 400 leverages functionality provided by electronic mail service provider 700 to implement an electronic signature workflow. In such embodiments one or more of devices 110, 210, 310 includes an electronic mail client 114, 214, 314 that is configured to interact with electronic mail service provider 700. Each of electronic mail clients 114, 214, 314 can therefore be understood as providing one possible interface for accessing the functionality associated with electronic signature server 400. For example, electronic mail clients 114, 214, 314 can be used to send and receive electronic documents, including both signed and unsigned documents, as well as other messages relating to the status or operation of an electronic signature workflow. Electronic mail clients 114, 214, 314 can be implemented using any suitable commercially or freely available electronic mail client, examples of which include Microsoft Outlook (Microsoft Corp., Redmond, Wash.) and Mozilla Thunderbird (Mozilla Foundation, Mountain View, Calif.).

In some cases electronic signature server 400 generates electronic mail messages containing user interface elements such as buttons and checkboxes that enable the message recipient to control certain aspects of an electronic signature workflow by responding to queries contained within the message. For example, in one embodiment yes/no buttons allow a message recipient to respond to inquiries such as whether the terms of a particular document are assented to, or whether delegation of signature authority is permitted in a particular situation. This allows the message recipient to control certain aspects of an electronic signature workflow from within a user interface provided by one of electronic mail clients 114, 214, 314.

Here is an example of how electronic mail clients 114, 214, 314 can be used in conjunction with a workflow managed by electronic signature server 400. Document originator 100 generates a purchase agreement and identifies intended signatory 200. Once document originator 100 indicates that the purchase agreement is ready to be signed, electronic signature server 400 sends an electronic mail message to intended signatory 200 with a request for signature. An unsigned copy of the purchase agreement is attached to the message. Unbeknownst to document originator 100, intended signatory 200 is unavailable to respond to the request because he left the office early to go to a baseball game. However, before leaving, intended signatory 200 configured and activated an autoreply feature 214' provided by electronic mail client 214. Intended signatory 200 also previously configured a delegation rule managed by electronic signature server 400 indicating that if server 400 ever receives an autoreply notification in response to sending a signature request to intended signatory 200, the signature request should instead be forwarded to delegate 300. If the delegation of signature authority is permitted by document originator 100, electronic signature server 400 sends an electronic mail message to delegate 300 with a request to sign the purchase agreement. An unsigned copy of the purchase agreement is attached to the message. Delegate 300 views and electronically signs the purchase order from within a user interface provided by electronic mail client 314. Document originator 100 may permit delegation of signature authority by, for example, responding to an electronic mail message inquiry containing the delegation request and yes/no answer buttons.

While this workflow represents one example of how electronic mail service provider 700 and electronic mail clients 114, 214, 314 can be used to implement an electronic signature workflow, numerous variations of such a workflow can be implemented in other embodiments. For example, in an alternative embodiment instead of sending a document as an attachment to an electronic mail message, a message that includes a network address that links to a location where the document is stored, such as in networked document repository 600, is sent. In still other embodiments, after an electronic document has been signed, signed copies of the document are distributed to document originator 100, intended signatory 200, delegate 300, and any other designated users via electronic mail messages.

Referring still to the example embodiment illustrated in FIG. 1, electronic signature server 400 can be configured to manage and orchestrate workflows that enable documents provided by document originator 100 to be distributed to intended signatory 200 and delegate 300, and that enable intended signatory 200 or delegate 300 to electronically sign, assent to the terms of, or otherwise interact with such documents. Electronic signature server 400 is also optionally configured to record and/or respond appropriately to feedback indicating that intended signatory 200 or delegate 300 does not assent to the terms of a received document. To this end, electronic signature server 400 includes one or more modules configured to implement certain of the functionalities disclosed herein, and optionally further includes hardware configured to enable such implementation. Examples of enabling hardware include a processor 410, a memory 420, a communication module 440, and a bus and/or interconnect 490. Examples of implementing software include an operating system 430, a delegation rule configuration module 450, a signature configuration module 460, a delegation module 470, and an interactivity module 480. Additional or alternative enabling hardware components and implementing software components can be used in other embodiments.

Processor 410 can be any suitable processor, and may include one or more coprocessors or controllers, such as an audio processor or a graphics processing unit, to assist in processing operations of electronic signature server 400. Operating system 430 may comprise any suitable operating system, such as Google Android (Google Inc., Mountain View, Calif.), Microsoft Windows (Microsoft Corp., Redmond, Wash.), Apple iOS (Apple Inc., Cupertino, Calif.) or Apple OS X (Apple Inc., Cupertino, Calif.). As will be appreciated in light of this disclosure, the techniques provided herein can be implemented without regard to the particular operating system provided in conjunction with electronic signature server 400, and therefore may also be implemented using any suitable existing or subsequently developed platform. Communication module 440 can be any appropriate network chip or chipset which allows for wired and/or wireless communication via network 500 to external components such as one or more of the other devices, components or systems described herein. Bus and/or interconnect 490 may also be provided to allow for inter- and intra-device communications using, for example, communication module 440.

Memory 420 can be implemented using any suitable type of digital storage, such as one or more of a disk drive, a universal serial bus drive, flash memory, and/or random access memory. From a conceptual standpoint, memory 420 can be understood as comprising a document repository 422, a collection of one or more delegation rules 424, and audit data 426. In some embodiments these are physically separate components, while in other embodiments the distinction is logical rather than physical. Document repository 422 is used as a repository for pending and completed requests for electronic signature, and thus may contain both signed and unsigned documents which have been, or are being, processed by electronic signature server 400. The documents stored in document repository 422 are optionally encrypted, for example based on a password that is not retained at electronic signature server 400. Delegation rules 424 establish how signature authority for certain documents should be passed from intended signatory 200 to delegate 300, and can be defined in terms of parameters such as intended signatory 200, one or more delegates 300, a period of delegation, document characteristics, identity of document originator 100, and a reason for the delegation of signature authority. Other parameters can be used in other embodiments. In general, delegation rules 424 can be understood as being defined by intended signatory 200. In one embodiment electronic signature server 400 includes a delegation rule user interface module configured to allow intended signatory 200 and/or other authorized users to browse, edit, define, and otherwise manipulate delegation rules 424.

Audit data 426 comprises data that characterizes an electronic signature workflow, and in particular, the various events that occur over the course of such a workflow. Such events may include events related to a delegation of signature authority, such as an event that causes a delegation rule to be invoked, the forwarding of a signature request to delegate 300, or the execution of a document by delegate 300. In certain embodiments audit data 426 also includes metadata that can uniquely identify a document processed by electronic signature server 400. Examples of such metadata include file identifiers, file timestamps, file metadata, signatory identifiers, signature timestamps, device identifiers, catalog flags, one or more digital signatures if such signatures are maintained outside the document, and the like. Audit data 426 optionally includes hash data that characterizes the document and/or its electronic signature.

Still referring to the example embodiment illustrated in FIG. 1, electronic signature server 400 further comprises delegation rule configuration module 450. Delegation rule configuration module 450 comprises instructions encoded on a computer readable medium that, when executed using a processor, cause a delegation rule configuration process to be invoked. The delegation rule configuration process allows a user, such as intended signatory 200, to define how signature authority for a certain class of documents is delegated. Intended signatory 200 can define a delegation rule in terms of, for example, the identity of one or more delegates 300, a period of delegation, document characteristics, and a reason for the delegation of signature authority. Not all of these characteristics need to be defined in a given implementation. For example, a delegation rule that does not specify document characteristics may simply be applied to all documents received in a specified timeframe. Likewise, a delegation rule that does not specify a timeframe may simply be applied to all documents received from a particular document originator. In certain embodiments delegation rule configuration module 450 comprises instructions that are capable of generating a delegation rule user interface module that allows intended signatory 200 and/or other authorized users to browse, edit, define, and otherwise manipulate delegation rules 424.

In certain embodiments electronic signature server 400 further comprises signature configuration module 460. Signature configuration module 460 comprises instructions encoded on a computer readable medium that, when executed using a processor, cause a signature configuration process to be invoked. The signature configuration process allows a user, such as document originator 100, to define certain parameters of an electronic signature workflow. For example, in one embodiment the signature configuration process allows document originator 100 to identify one or more intended signatories 200, designate signature fields, designate data entry fields, and indicate whether intended signatory 200 is allowed to delegate his/her authority to sign a document without preapproval from document originator 100. The signature configuration process also optionally allows document originator 100 to define how a document should be assented to and how such assent should be authenticated, if at all.

Referring again to the example embodiment illustrated in FIG. 1, electronic signature server 400 further comprises delegation module 470. In such embodiments, delegation module 470 comprises instructions encoded on a computer readable medium that, when executed using a processor, cause a delegation process to be invoked. The delegation process can be defined according to one of delegation rules 424, and thus in certain embodiments the delegation process is capable of determining, for example, when to invoke a delegation rule. For instance, in some cases a particular delegation rule may be invoked when electronic signature server 400 receives an automatically generated message in response to sending a signature request to intended signatory 200. In other cases, a particular delegation rule may be invoked when electronic signature server 400 receives a request from document originator 100 that is to be directed to a particular intended signatory that is known to be unavailable at a given time. The delegation process is also optionally capable of determining whether a delegation rule has been defined that is applicable to a detected condition. For example, in one implementation a particular delegation rule indicates that delegate 300 should be forwarded any document requests that intended signatory 200 has not responded to within 48 hours of being sent from electronic signature server 400. In some cases the delegation process also determines whether document originator 100 must approve a delegation of signature authority before the document is sent to delegate 300, as may be required by law in certain circumstances.

Electronic signature server 400 also optionally includes interactivity module 480. Interactivity module 480 comprises instructions encoded on a computer readable medium that, when executed using a processor, cause an interactive electronic signature process to be invoked. In certain embodiments the interactive electronic signature process provides an interface to users accessing the resources managed by electronic signature server 400. Such an interface may be provided by way of a graphical user interface rendered on a digital display, although other types of interfaces, such as voice response, touchtone, hand gesture, and textual interfaces, can be implemented as well. In one embodiment the interface is provided as a webpage displayed using a web browser executing on one or more of devices 110, 210, 310. A separate document originator user interface may be provided for document originator 100, as compared to a distinct document recipient user interface that is provided for intended signatory 200 and/or delegate 300.

For example, in one embodiment the interactive electronic signature process generates a graphical user interface capable of guiding delegate 300 through the process of obtaining, reviewing, assenting to (or declining to assent to), and/or otherwise interacting with a document. The electronic signature process invoked by interactivity module 480 is also optionally capable of applying an electronic signature to a document and updating audit data 426 as appropriate. Additional or alternative workflow aspects may be specified in other embodiments, and thus it will be appreciated that the various embodiments disclosed herein are not limited to any particular functionality provided by the interactive electronic signature process invoked by interactivity module 480.

Document originator 100, intended signatory 200, and delegate 300 can communicate with each other via network 500. Network 500 can also be used to access supplementary resources such as networked document repository 600 and electronic mail service provider 700. Network 500 may be a local area network (such as a home-based or office network), a wide area network (such as the Internet), or a combination of such networks, whether public, private, or both. For example, in certain embodiments at least a portion of the functionality associated with network 500 is provided by a cellular data or Wi-Fi network, thereby making it easier for users of smartphones and tablet computers to interact with electronic signature server 400. In general, communications amongst the various entities and resources described herein may occur via any suitable type of wired and/or wireless connection. In some cases access to resources on a given network or computing system may require credentials such as a username and password, and/or may require compliance with any other suitable security mechanism. Furthermore, while one document originator 100, one intended signatory 200, and one delegate 300 are illustrated in FIG. 1, it will be appreciated that, in general, the system may comprise a distributed network of tens, hundreds, thousands, or more document originators 100, intended signatories 200, and delegates 300, each capable of interacting with a correspondingly large number of electronic signature servers 400.

The embodiments disclosed herein can be implemented in various forms of hardware, software, firmware, and/or special purpose processors. For example, in one embodiment a non-transitory computer readable medium has instructions encoded thereon that, when executed by one or more processors, cause one or more of the document distribution and interaction methodologies disclosed herein to be implemented. The instructions can be encoded using any suitable programming language, such as C, C++, object-oriented C, Swift, JavaScript, Java, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into other software applications, such as document management systems, word processors, or document viewers. For example, an application configured to view portable document format (PDF) files can be configured to implement certain of the functionalities disclosed herein upon detecting the presence of signature fields or other metadata in a given document, including signature fields intended for a handwritten signature. The systems disclosed herein may also optionally leverage services provided by other software applications, such as electronic mail readers. The computer software applications disclosed herein may include any number of different modules, sub-modules, or other components of distinct functionality, and can provide information to, or receive information from, still other components and/or subcomponents. These modules can be used, for example, to communicate with an input and/or output device such as a display screen, a touch sensitive surface, a printer, and/or any other suitable input/output device. Other components and functionality not reflected in the illustrations will be apparent in light of this disclosure, and it will be appreciated that the various embodiments disclosed herein are not limited to any particular hardware or software configuration. Thus in other embodiments electronic signature server 400 may comprise additional, fewer, or alternative subcomponents as compared to those included in the illustrated embodiments.

The aforementioned non-transitory computer readable medium may be any suitable medium for storing digital information, such as a hard drive, a server, a flash memory, and/or random access memory. In alternative embodiments, the computer and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

Delegation Rule Definition Methodology

Figure 2:
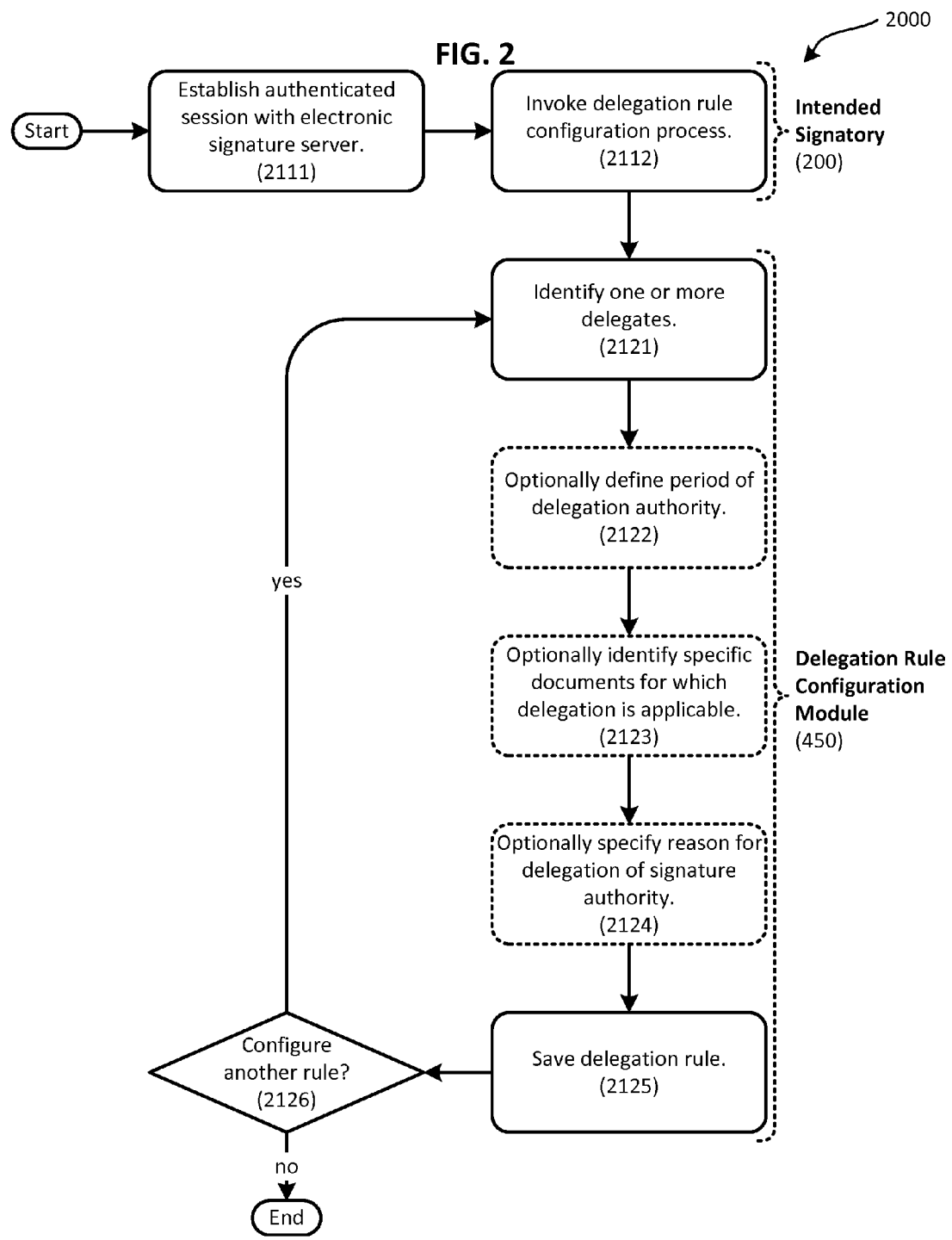
FIG. 2 is a flowchart illustrating an example method for defining a delegation rule that governs the processing of a subsequently received electronic signature request.

FIG. 2 is a flowchart illustrating an example method 2000 for defining a delegation rule that governs the processing of a subsequently received electronic signature request. As can be seen, method 2000 includes a number of phases and sub-processes, the sequence of which may vary from one embodiment to another. However, when considered in the aggregate, these phases and sub-processes form part of an improved electronic signature framework that is capable of delegating signature authority in response to detected conditions. The framework is responsive to user input in accordance with certain of the embodiments disclosed herein. Method 2000 can be implemented, for example, using the system architecture illustrated in FIG. 1 and described herein. However other system architectures can be used in other embodiments, as will be apparent in light of this disclosure. To this end, the correlation of the various functionalities shown in FIG. 2 to the specific components illustrated in FIG. 1 is not intended to imply any structural and/or use limitations. Rather other embodiments may include, for example, varying degrees of integration wherein multiple functionalities are effectively performed by one system or module. For example, in an alternative embodiment a single module can be used to establish a secure session with intended signatory 200 and to configure a delegation rule. Thus other embodiments may have fewer or more modules depending on the granularity of implementation. Numerous variations and alternative configurations will be apparent in light of this disclosure.

As illustrated in FIG. 2, method 2000 commences with intended signatory 200 establishing an authenticated session with electronic signature server 400. See reference numeral 2111 in FIG. 2. This can be accomplished using any suitable authentication framework, which may involve, for example, requiring intended signatory 200 to submit an authenticable access token, digital certificate, username, and/or password. Once intended signatory 200 has been authenticated, a delegation rule configuration process can be invoked. See reference numeral 2112 in FIG. 2. This can be accomplished, for example, by selecting an appropriate menu option or other hyperlink provided by electronic signature server 400. In general, intended signatory 200 will be understood as invoking the delegation rule configuration process in advance of, or at the time of, the delegation of signature authority, such that at least one future signature request that is sent to intended signatory 200 will instead be forwarded to delegate 300 for signature.

Intended signatory 200 uses the delegation rule configuration process invoked by delegation rule configuration module 450 to identify one or more delegates 300. See reference numeral 2121 in FIG. 2. This can be accomplished by providing an email address, telephone number, or other identifier associated with delegate 300. In some cases, multiple delegates 300 may be specified, such that a document that was originally to be signed by intended signatory 200 should instead be signed by multiple delegates 300. Beyond identifying at least one delegate 300, other aspects of the delegation rule are optional. For example, if only delegate 300 is identified, the delegation rule will represent a delegation of signature authority to the identified delegate 300 for all signature requests that are sent to intended signatory 200. However, in many cases a more refined delegation of signature authority is desired, and thus intended signatory 200 can define additional criteria for the delegation rule. In some cases multiple delegates 300 may be identified, in which case intended signatory 200 can specify whether all or a subset of the multiple delegates 300 are required to sign a document. Specifying that only one of multiple delegates 300 are required to sign a document may be useful in expediting an electronic signature workflow since it effectively enables the workflow to advance once the most responsive of the multiple delegates 300 responds to a signature request.

In certain embodiments the delegation rule configuration process invoked by delegation rule configuration module 450 can be used to define a period of delegation authority. See reference number 2122 in FIG. 2. The period of delegation authority can be defined by a starting time and an ending time, or it can be left open-ended, such that it persists until terminated by an authorized user. In alternative embodiments, the period of delegation authority begins, or the delegation rule is invoked, in response to a detected event, such as receipt of an automatically generated email response. This allows intended signatory 200 to activate a delegation rule simply by activating autoreply feature 214' in his/her electronic mail client 214. This avoids any need for intended signatory 200 to separately configure electronic mail and electronic signature services when preparing for time away from the office. In a modified embodiment, the period of delegation authority begins upon receipt of an automatically generated email response, and ends only when intended signatory 200 acts to terminate the delegation. In this case, electronic signature server 400 is optionally configured to send intended signatory 200 periodic reminders that a delegation rule remains active. If no period of delegation authority is specified, the delegation rule can be applied to all signature requests sent to intended signatory 200, regardless of when such requests are received. In another modified embodiment, the period of delegation authority begins upon receipt of the automatically generated electronic mail response and continues until an end date and time specified by intended signatory 300 in the automatically generated electronic mail response.

The delegation rule configuration process invoked by delegation rule configuration module 450 can also be used to identify specific documents for which the delegation of signature authority is applicable. See reference numeral 2123 in FIG. 2. For example, in one implementation intended signatory 200 wishes to delegate signature authority only for those documents relating to a particular transaction, and thus defines a delegation rule that applies to documents containing a particular keyword that is associated with the transaction of interest. In another embodiment, intended signatory 300 wishes to delegate signature authority only for those documents relating to a particular transaction, and thus defines a delegation rule that applies to documents that are categorized by electronic signature server 400 into one or more categories that are associated with the transaction of interest. Such categorization can be implemented using tags, keywords, or the like. In another implementation intended signatory 200 wishes to delegate signature authority only for those documents received from a particular document originator 100, and thus defines a delegation rule that applies only to documents received from document originator 100. In yet another embodiment, and as a catchall provision, intended signatory 200 delegates signature authority automatically in response to any signature request, which he/she does not respond to within a specified time period. In general, any parameter that can be used to characterize a class of documents can be used to specify which documents are subject to a particular delegation rule. In one embodiment, if no documents are identified as being subject to the defined delegation rule, then it is assumed that all documents that satisfy the other specified criteria are subject to the delegation rule.

Intended signatory 200 may specify a reason for the delegation of signature authority. See reference numeral 2124 in FIG. 2. While the reason may not necessarily affect the electronic signature workflow itself, it can be recorded with audit data 426, and thus specifying a reason allows intended signatory 200 to provide insight into why the delegation rule was established. This may be useful in implementations where the delegation of signature authority must be approved by document originator 100 before the delegation becomes effective, since the reason can be provided to document originator 100 along with the request for approval. Once the delegation rule has been sufficiently defined, it is saved. See reference numeral 2125 in FIG. 2. In one implementation, delegation rules 424 are saved in memory 420 that is administered by electronic signature server 400.

Multiple delegation rules can be established. For instance, intended signatory 200 may wish to define multiple delegation periods, wherein a different delegate 300 has signature authority during each of the defined periods. This could be useful, for example, in an implementation wherein intended signatory 200 is preparing for a four-week absence. For the first two weeks he/she defines a first delegation rule delegating signing authority to an office manager. However, for the second two weeks the office manager will also be absent, and thus intended signatory 200 defines a second delegation rule for the period of second two weeks, the second rule delegating signature authority to a regional manager. Intended signatory 200 may additionally or alternatively wish to define different delegates 300 for different types of documents. This is useful, for example, in an implementation wherein intended signatory 200 will delegate signing authority for work-related documents to a manager, but will delegate signing authority for personal documents to one or more family members. A first delegation rule is defined granting the manager signature authority for documents received from users belonging to a particular email domain (for example, *@MyCompany.example.com). A second delegation rule is defined granting the one or more family members signature authority for documents containing the phrase "Health Insurance" or documents which are categorized into a "Health Insurance" category, such as documents containing the keywords "accident" and "coverage". Intended signatory 200 can also specify a sequence in which the delegation rules are applied, such that one rule takes precedence over other rules, and if invoked, preempts processing of other rules. Where such rules are established, electronic signature server 400 evaluates the electronic mail address associated with document originator 100 and reviews the content of the unsigned document. Delegation module 470** applies an appropriate delegation rule based on this analysis.

Therefore, in general, after defining a first delegation rule, the delegation rule configuration process is configured to determine whether another delegation rule is to be configured. See reference numeral 2126 in FIG. 2. If not, intended signatory 200 can end the delegation rule configuration process and terminate the authenticated session with electronic signature server 400. Otherwise, the delegation rule configuration process can be repeated as appropriate. Defining one or more delegation rules in advance of the delegator's unavailability helps to streamline electronic signature workflows by reducing the likelihood that such workflows stall as a result of intended signatory 200 being unavailable or unresponsive.

Delegation Rule Application Methodology

FIGS. 3A through 3C comprise a flowchart illustrating an example method 3000 for soliciting an electronic signature in a workflow that is subject to a previously defined delegation rule. As can be seen, method 3000 includes a number of phases and sub-processes, the sequence of which may vary from one embodiment to another. However, when considered in the aggregate, these phases and sub-processes form part of an improved electronic signature framework that is capable of delegating signature authority in response to detected conditions. The framework is responsive to user input in accordance with certain of the embodiments disclosed herein. Method 3000 can be implemented, for example, using the system architecture illustrated in FIG. 1 and described herein. However other system architectures can be used in other embodiments, as will be apparent in light of this disclosure. To this end, the correlation of the various functionalities shown in FIGS. 3A through 3C to the specific components illustrated in FIG. 1 is not intended to imply any structural and/or use limitations. Rather other embodiments may include, for example, varying degrees of integration wherein multiple functionalities are effectively performed by one system or module. For example, in an alternative embodiment a single module can be used to establish a secure session with document originator 100 and to configure an electronic signature workflow. Thus other embodiments may have fewer or more modules depending on the granularity of implementation.

Method 3000 can be implemented in both parallel signing workflows and sequential signing workflows. Furthermore, while method 3000 is described as being invoked in response to document originator 100 generating a new electronic signature request, in other applications method 3000 can be invoked in response to a reminder to respond to a previously-sent electronic signature request. For example, an initial electronic signature request is sent to intended signatory 200, who fails to immediately respond to such request. Intended signatory 200 is unavailable when a periodic reminder is later sent, and an autoreply notification is returned to electronic signature server 400 as a result of sending the reminder. The delegation workflows disclosed herein govern how a new signature request is routed to delegate 300. Before becoming unavailable, intended signatory 200 identified delegate 300 as having signature authority. Numerous variations and alternative configurations will be apparent in light of this disclosure.

As illustrated in FIG. 3A, method 3000 commences with document originator 100 establishing an authenticated session with electronic signature server 400. See reference numeral 3111 in FIG. 3A. This can be accomplished using any suitable authentication framework, which may involve, for example, requiring document originator 100 to submit an authenticable access token, digital certificate, username, and/or password. Once document originator 100 has been authenticated, an electronic signature configuration process is invoked. See reference numeral 3112 in FIG. 3A. This can be accomplished by selecting an appropriate menu option or other hyperlink provided by electronic signature server 400. In general, document originator 100 will be understood as invoking the electronic signature configuration process when he/she wishes to send an electronic document for signature. In some cases, commonly invoked workflows can be saved, thus preventing document originator 100 from having to reconfigure the same workflow often.

In one implementation, invoking the electronic signature configuration process involves document originator 100 providing electronic signature server 400 with an unsigned document that is to be signed by intended signatory 200. See reference numeral 3114 in FIG. 3A. This can be accomplished, for example, by uploading a copy of the unsigned document from document originator's device 110 to electronic signature server 400. Alternatively, electronic signature server 400 can retrieve the unsigned document from networked document repository 600. In some cases document originator 100 provides the unsigned document to electronic signature server 400 on his/her own accord. In other cases, document originator 100 provides the unsigned document in response to a request, such as a request from intended signatory 200. For example, in one implementation a new customer (intended signatory 200) requests a license agreement form a software vendor (document originator 100). In response, the software vendor provides a copy of the new license agreement (unsigned document) to electronic signature server 400, and configures the workflow that dictates how the new customer's electronic signature should be requested.

Document originator 100 can use the signature configuration process invoked by signature configuration module 460 to designate one or more signature fields in the unsigned document. See reference numeral 3121 in FIG. 3A. One or more data entry fields are also optionally designated. See reference numeral 3122 in FIG. 3A. Example data entry fields include date fields, address fields, telephone number fields, and the like. Such field designations can be performed automatically based on a field detection algorithm, or can be performed manually based on input from document originator 100. For example, in one embodiment metadata tags inserted into the unsigned document by document originator 100 when the document is authored indicate how signature configuration module 460 should designate the signature and data entry fields. In an alternative embodiment, document originator 100 designates the fields manually after the unsigned document is initially provided to, and optionally analyzed by, electronic signature server 400.

Document originator 100 can also use the signature configuration process invoked by signature configuration module 460 to identify one or more intended signatories 200. See reference numeral 3123 in FIG. 3A. In one embodiment intended signatory 200 is identified via an electronic mail address, although any other suitable identification technique can be used, including the use of an identification number, a username, an alias, a real name, or a telephone number. In some cases document originator 100 can select a name from an address book or other directory of registered users of electronic signature server 400. Such an address book optionally includes an indicator associated with potential signatories who have defined delegation rules which are administered by electronic signature server 400. In some cases a different indicator is displayed for potential signatories associated with delegation rules which are currently active, thus indicating that the potential signatory may be presumed to be unavailable to sign the document. Depending on the particular workflow, document originator 100 may identify multiple intended signatories 200 who should be required to sign the document. In such cases, electronic signature server 400 may suggest to document originator 100 to directly select delegate 300 as an intended signatory, instead of first sending the document signature request to intended signatory 200, and waiting for the delegation rules to be invoked, thereby causing the document to be sent to delegate 300.

In certain embodiments document originator 100 also uses the signature configuration process invoked by signature configuration module 460 to specify circumstances, if any, in which delegation of signature authority requires preapproval of document originator 100. See reference numeral 3124 in FIG. 3A. In other embodiments document originator 100 may specify conditions under which delegation of signature authority is prohibited altogether. Document originator 100 may wish to implement requirements such as these where it is important that a specific party be obligated by the signed document, such as is often the case for personal service contracts. Such requirements may also be advisable for certain high-value transactions or other situations where delegation could threaten the commercially reasonable expectations of an obligee. In some cases a preapproval requirement may be enforced for all delegations of signature authority, while in other cases it may be enforced only in specified circumstances. For example, in one implementation document originator 100 specifies that intended signatory 200 may delegate his/her signature authority, but that any delegate 300 may not further delegate his/her signature authority. This is an example of a limitation on the chain of delegation. In another implementation document originator 100 may specify that intended signatory 200 may delegate signature authority within a particular organization, but may not delegate signature authority outside that organization. Such a requirement could be enforced, for example, by restricting delegation to delegates 300 having an email address belonging to a particular domain (for example, \*\*\*@MyCompany.example.com). A wide range of other similar restrictions, including multiple restrictions, can be implemented in other embodiments. In some cases imposing such conditions triggers a requirement that document originator 100 approve the delegation of signature authority, while in other cases such conditions cause the delegation to be rejected automatically.

Once document originator 100 has used the signature configuration process to define an electronic signature workflow, the delegation process invoked by delegation module 470 then determines whether a delegation rule is applicable to the defined workflow. See reference number 3141 in FIG. 3A. In one implementation, such a determination is made based on whether intended signatory 200 has defined a delegation rule that (a) is currently active, and (b) encompasses the unsigned document. This may involve, for example, comparing one or more conditions specified in delegation rules 424 with the properties of the unsigned document and the defined workflow. If it is determined that one or more of delegation rules 424 are applicable to the defined workflow, the applicable delegation rule is invoked, as will be described in turn. If multiple delegation rules 424 are determined to be applicable to the defined workflow, it may be possible that intended signatory 200 wishes for the document be signed by multiple delegates 300 in his/her absence.

If none of delegation rules 424 are applicable to the defined workflow, communication module 440 sends intended signatory 200 instructions for accessing and signing the document. See reference numeral 3151 in FIG. 3A. In one embodiment the instructions sent to intended signatory 200 comprise an electronic mail message containing an address indicating a networked storage location where the unsigned document is cached. In an alternative embodiment, the unsigned document is transmitted directly to intended signatory 200, for example as an attachment in an electronic mail message, in which case the unsigned document need not be retained at electronic signature server 400. Either way, intended signatory 200 may have activated autoreply feature 214' provided by his/her electronic mail client 214. Communication module 440 is configured to determine whether an autoreply notification is received in response to transmission of the signature instructions. See reference numeral 3152 in FIG. 3A.

If no autoreply notification is received, it can be assumed, at least as an initial matter, that intended signatory 200 is available to sign the document. In this case, intended signatory 200 decides whether to assent to the document terms. See reference numeral 3211 in FIG. 3B. If intended signatory 200 assents, he/she electronically signs the document. See reference numeral 3212 in FIG. 3B. In this case, the interactive electronic signature process invoked by interactivity module 480 adds an electronic signature of intended signatory 200 to the document to reflect the intended signatory's assent. See reference numeral 3221 in FIG. 3B. For example, in one implementation the signatory's name is placed on the document in a location where a signature would normally be placed. The signatory's printed name optionally appears adjacent to the signature name. The interactive electronic signature process also updates audit data 426 to reflect the intended signatory's assent. See reference numeral 3222 in FIG. 3B. This may involve, for example, recording data that characterizes the signature, such as the time of signature and/or a device identifier associated with the signature. A hash of the signed document and/or of data characterizing the signature may also be recorded. Communication module 440 distributes a copy of the signed document to designated parties and document repository 422. See reference numeral 3231 in FIG. 3B. In one implementation, the designated parties include document originator 100 and signatory 200. The signed document can be distributed as an attachment to an electronic mail message, although other distribution techniques can be used in other embodiments. For example, in an alternative embodiment, the signed document is stored in document repository 422, and document originator 100 and signatory 200 are sent a notification with instructions for accessing the signed document in document repository 422. At this point, the electronic signature workflow can be considered complete.

If intended signatory 200 does not assent to the document terms, interactive electronic signature process determines whether intended signatory 200 has simply not responded to the request for asset (resulting in a "stale request"), or has affirmatively refused to assent to the document terms. See reference numeral 3241 in FIG. 3B. If intended signatory has affirmatively refused to assent to the document terms, audit data 426 is updated to reflect the intended signatory's refusal. See reference numeral 3242 in FIG. 3B. This may involve, for example, recording data that characterizes the refusal, such as the time of refusal and/or a device identifier associated with the refusal. In certain embodiments communication module 440 sends a refusal notification to document originator 100. See reference numeral 3251 in FIG. 2B. This alerts document originator 100 to the fact that the document remains unsigned. At this point, the electronic signature workflow can be considered complete, although document originator 100 may elect to initiate another substitute electronic signature workflow.

In some cases intended signatory 200 may have expressly indicated that he/she is unavailable to respond to an electronic signature request. One way of providing such an express indication is by establishing a delegation rule that applies to a given electronic signature request. See reference numeral 3141 in FIG. 3A. However, in other cases intended signatory 200 may only provide an implied indication that he/she is unavailable to respond to an electronic signature request. This may occur where, for example, intended signatory 200 activates autoreply feature 214' in electronic mail client 214. See reference numeral 3152 in FIG. 3A. Because an autoreply notification may only be sent to a particular recipient once during the intended signatory's absence, in some cases the autoreply message is parsed in an attempt to infer a period that the intended signatory will be absent. Such parsing may involve, for example, searching for mention of a future date in the message, particularly a future date preceded by the words "until" or "through". In some cases a delegation rule is configured or modified to remain active until a date or time that is parsed from an autoreply message. Electronic signature server 400 is therefore capable of responding to receipt of an unanticipated autoreply notification.

An implied indication that intended signatory 200 is unavailable may also occur when intended signatory does not respond to a signature request after a specified period of time. See reference numeral 3241 in FIG. 3B. Enabling an electronic signature delegation workflow to be invoked even where intended signatory 200 has not provided an express indication of unavailability advantageously reduces the likelihood that electronic signature workflows stall if intended signatory 200 forgets to or does not have an opportunity to configure autoreply feature 214' before becoming unavailable.

Where intended signatory 200 only provides an implied indication that he/she is unavailable to respond to an electronic signature request, the delegation process invoked by delegation module 470 determines whether an applicable delegation rule exists. See reference numeral 3311 in FIG. 3C. This can be accomplished by comparing the various conditions defined in delegation rules 424 with the circumstances resulting in the implied indication that intended signatory 200 is unavailable to respond to the electronic signature request. For example, in one case one of delegation rules may apply to a circumstance where an autoreply notification is received from intended signatory 200. Another delegation rule may apply to a circumstance where intended signatory 200 has not responded to a request for electronic signature after 48 hours of being sent from electronic signature server 400. If none of delegation rules 424 apply to the circumstance which has led to the implied indication of unavailability, the interactive electronic signature process invoked by interactivity module 480 updates audit data 426 to reflect the unavailability of intended signatory. See reference numeral 3342 in FIG. 3C. In certain embodiments communication module 440 sends an unavailability notification to document originator 100. See reference numeral 3351 in FIG. 3C. This alerts document originator 100 to the fact that the document remains unsigned. At this point, the electronic signature workflow can be considered complete, although document originator 100 may elect to initiate another substitute electronic signature workflow.

Where a delegation rule is applicable to a defined electronic signature workflow (see reference numeral 3141 in FIG. 3A), it can be assumed that intended signatory 200 will not sign the document, and therefore it is unnecessary to send the unsigned document to intended signatory 200. Instead, the unsigned document can be sent directly to delegate 300. However, in some cases the delegation process first determines whether document originator 100 must preapprove the delegation of signature authority. See reference numeral 3312 in FIG. 3C. Such a determination may be based on whether document originator established such a requirement when the electronic signature workflow was initially configured. If delegation preapproval is required, communication module 440 sends document originator 100 a request to approve the delegation of signature authority to delegate 300. See reference numeral 3321 in FIG. 3C. The request optionally includes a reason for the delegation as specified by intended signatory 200 when the applicable delegation rule was initially configured. Document originator 100 then decides whether the delegation of signature authority should be approved. See reference numeral 3331 in FIG. 3C. If not, interactivity module 480 updates audit data 426 to reflect the fact that document originator 100 refused to assent to the requested delegation of signature authority. See reference numeral 3341 in FIG. 3C. Audit data 426 can also be updated to reflect the fact that intended signatory 200 is unavailable. See reference numeral 3342 in FIG. 3C. In certain embodiments communication module 440 sends an unavailability notification to document originator 100. See reference numeral 3351 in FIG. 3C. This alerts document originator 100 to the fact that the document remains unsigned. At this point, the electronic signature workflow can be considered complete, although document originator 100 may elect to initiate another substitute electronic signature workflow. In some cases, even if the aforementioned preapproval is not required, document originator 100 is still sent a notification indicating that intended signatory 200 has delegated his/her signature authority to delegate 300.

If delegation preapproval is not required (see reference numeral 3312 in FIG. 3C), or if document originator 100 provides a required preapproval (see reference numeral 3331 in FIG. 3C), the previously described electronic signature workflow is invoked, with delegate 300 substituted for intended signatory 200. This may involve, for example, one or more of: (a) determining whether another delegation rule is applicable, for example as a result of delegate 300 also having defined a delegation rule that is currently active and that encompasses the unsigned document (see reference numeral 3141 in FIG. 3A); (b) sending delegate 300 instructions for accessing and signing the document (see reference numeral 3151 in FIG. 3A); (c) determining whether an autoreply notification is received from delegate 300 (see reference numeral 3152 in FIG. 3A); (d) determining whether delegate 300 assents to the document terms (see reference numeral 3211 in FIG. 3B); and (e) responding to the delegate's assent or refusal to assent as described herein with respect to intended signatory 200. The signature instructions sent to delegate 300 optionally indicate that intended signatory 200 has delegated his/her signature authority to delegate 300. In general, it will therefore be appreciated that delegate 300 may further delegate signature authority to other delegates in the same way the intended signatory 200 originally delegated signature authority to delegate 300. Thus when a user defines a delegation rule using delegation module 470, the delegation rule may be applied in response to the user being intended signatory 200 or a delegate 300 who wishes to further delegate signature authority.

If the document is ultimately executed by a party other than intended signatory 200, audit data 426 can be updated to include the chain of delegation. See reference numeral 3222 in FIG. 3B. Audit data 426 may additionally or alternatively include the conditions contained within the applicable delegation rule. For example, in one embodiment audit data 426 indicates that signature authority was delegated to delegate 300 for all documents submitted to intended signatory 200 within a specific time window. Audit data 426 optionally specifies the reason for delegation of signature authority, if provided by delegator.

In implementations wherein delegate 300 electronically signs a document on behalf of intended signatory 200, a notation is optionally appended to the document reflecting the delegation of signature authority. FIG. 4 illustrates an example graphical representation of a document 10 that has been signed by delegate 300, and that includes a delegation of signature authority statement 14. Statement 14 includes the intended signatory's name 11 and the delegate's name 12. Statement 14 also optionally includes an audit data hyperlink 16 providing access to relevant audit data, which would indicate, for example, a chain of delegation or a reason for the delegation of signature authority. This allows the document to be automatically updated to reflect the delegation of signature authority without requiring document originator 100 to revise the document. The delegate's electronic signature 18 is also applied to document 10. In implementations where a chain of delegation exists, for example where a first delegate has subsequently delegated signature authority to a second delegate, the complete chain of delegation can be reflected in statement 14 included in document 10. The complete chain of delegation can also be reflected in audit data 426, accessible via audit data hyperlink 16. While FIG. 4 illustrates one way of reflecting delegation of signature authority on an electronically signed document, other manifestations of the delegation may be provided in other embodiments.

Further Example Embodiments

Numerous variations and configurations will be apparent in light of this disclosure. For instance, one example embodiment provides a computer-implemented electronic signature acquisition method 5000 that is illustrated in FIG. 5. The method comprises receiving, from an intended signatory, a delegation rule that specifies a delegate having signature authority for the intended signatory. See reference numeral 5100 in FIG. 5. The method further comprises receiving, from a document originator, an electronic document that is to be distributed to the intended signatory as part of an electronic signature workflow. The electronic document includes one or more document terms. See reference numeral 5200 in FIG. 5. The method further comprises determining that the delegation rule applies to the electronic document. See reference numeral 5300 in FIG. 5. The method further comprises sending, to the document originator, a notification that the intended signatory has delegated signature authority for the electronic document to the delegate. See reference numeral 5400 in FIG. 5. The method further comprises sending, to the delegate, instructions for assenting to the one or more document terms. See reference numeral 5500 in FIG. 5. The method further comprises modifying the electronic document to include an electronic signature of the delegate and a chain of delegation indicating that the intended signatory has delegated signature authority to the delegate. See reference numeral 5600 in FIG. 5. The method further comprises recording audit data in an audit data repository. The audit data specifies the chain of delegation and characterizes the electronic signature of the delegate. See reference numeral 5700 in FIG. 5. In some cases the notification includes a request for the document originator to approve delegation of signature authority for the electronic document to the delegate. In some cases the method further comprises receiving, from the document originator, instructions setting forth one or more conditions that delegation of signature authority from the intended signatory to the delegate must satisfy, wherein the one or more conditions includes a prohibition on further delegation of signature authority from the delegate to another party. In some cases the method further comprises receiving, from the intended signatory, a reason for delegation of signature authority to the delegate, wherein the notification sent to the document originator includes the reason. In some cases (a) the delegation rule further specifies a document characteristic; and (b) determining that the delegation rule applies to the electronic document further comprises determining that the document characteristic applies to the electronic document. In some cases (a) the delegation rule further specifies a keyword; and (b) determining that the delegation rule applies to the electronic document further comprises determining that the electronic document contains the keyword or that the electronic document is categorized into a category that is associated with a keyword specified by the intended signatory. In some cases determining that the delegation rule applies to the electronic document further comprises (a) sending the intended signatory initial instructions for assenting to the one or more document terms; and (b) determining that a specified time period has elapsed after sending the initial instructions without receiving any reply from the intended signatory.

Another example embodiment provides an electronic signature system. The system comprises a memory device. The system further comprises a processor that is operatively coupled to the memory device. The processor is configured to execute instructions stored in the memory device that, when executed, cause the processor to carry out an electronic signature delegation process. The electronic signature delegation process comprises receiving, from an intended signatory, parameters that define a delegation rule that specifies a delegate having signature authority for the intended signatory. The electronic signature delegation process further comprises receiving, from a document originator, metadata that identifies a document that is to be distributed to the intended signatory as part of a workflow. The document includes a plurality of document terms. The electronic signature delegation process comprises sending, to the intended signatory, first instructions for assenting to the plurality of document terms. The electronic signature delegation process comprises receiving an autoreply notification that is sent on behalf of the intended signatory, and that is sent in response to sending the first instructions to the intended signatory. The electronic signature delegation process comprises, in response to receiving the autoreply notification, determining applicability of the delegation rule. The electronic signature delegation process comprises sending, to the delegate, second instructions for assenting to the plurality of document terms in response to determining that the delegation rule is applicable. In some cases the electronic signature delegation process further comprises (a) receiving, from the intended signatory, a reason for delegation of signature authority to the delegate; and (b) sending, to the delegate with the second instructions, the reason for delegation of signature authority. In some cases the electronic signature delegation process further comprises (a) parsing the autoreply notification to identify a return date for the intended signatory; and (b) modifying the delegation rule to expire or be reevaluated by the intended signatory on the return date. In some cases the parameters that define the delegation rule specify a first delegate having signature authority for the intended signatory during a first time period, and a second delegate having signature authority for the intended signatory during a second time period. In some cases the electronic signature delegation process further comprises modifying the document to include an electronic signature of the delegate and a chain of delegation indicating that the intended signatory has delegated signature authority to the delegate. In some cases the first and second instructions are functionally equivalent. In some cases the electronic signature delegation process further comprises sending, to the document originator, a notification that the intended signatory has delegated signature authority for the document to the delegate. In some cases the electronic signature delegation process further comprises receiving, from the document originator, instructions with respect to whether the document originator must preapprove a delegation of signature authority before the delegate is sent the second instructions.

Another example embodiment provides a computer program product encoded with instructions that, when executed by one or more processors, cause a document workflow process to be carried out. The document workflow process comprises receiving, from an intended signatory, a delegation rule that specifies a delegate having signature authority for the intended signatory. The document workflow process further comprises receiving, from a document originator, an electronic document that is to be distributed to the intended signatory. The electronic document includes one or more document terms. The document workflow process further comprises determining that the delegation rule applies to the electronic document. The document workflow process further comprises sending, to the document originator, a notification that the intended signatory has delegated signature authority for the electronic document to the delegate. The document workflow process further comprises sending, to the delegate, instructions for assenting to the one or more document terms. The document workflow process further comprises modifying the electronic document to include an electronic signature of the delegate. The document workflow process further comprises recording audit data in an audit data repository. The audit data specifies a chain of delegation that indicates that the intended signatory has delegated signature authority to the delegate. The audit data also characterizes the electronic signature of the delegate. In some cases the document workflow process further comprises modifying the electronic document to include a hyperlink to the audit data stored in the audit data repository. In some cases determining that the delegation rule applies to the electronic document further comprises (a) sending the intended signatory initial instructions for assenting to the one or more document terms; and (b) receiving an autoreply notification that is sent on behalf of the intended signatory, and that is sent in response to sending the initial instructions to the intended signatory. In some cases (a) the delegation rule further specifies one or more identified document originators; and (b) determining that the delegation rule applies to the electronic document further comprises determining that the one or more identified document originators include the document originator. In some cases the document workflow process further comprises receiving, from the intended signatory, a reason for delegation of signature authority to the delegate, wherein the audit data recorded in the audit data repository includes the reason. In some cases (a) the delegation rule further specifies a keyword; and (b) determining that the delegation rule applies to the electronic document further comprises determining that the electronic document is categorized as being associated with a category that matches a keyword specified by the intended signatory.

The foregoing description has been presented for the purposes of illustration and description. It is not intended to be exhaustive or to limit the disclosure to the particular described embodiments. Therefore many modifications and variations are possible in light of this disclosure. Thus it is intended that the scope of the invention be limited not by this detailed description, but rather by the claims appended hereto.

This disclosure is related to U.S. patent application Ser. No. 14/069,674 (filed 1 Nov. 2013), the entire disclosure of which is hereby incorporated by reference herein. This disclosure is related to U.S. patent application Ser. No. 14/107,967 (filed 16 Dec. 2013), the entire disclosure of which is hereby incorporated by reference herein. This disclosure is related to U.S. patent application Ser. No. 14/534,583 (filed 6 Nov. 2014), the entire disclosure of which is hereby incorporated by reference herein. This disclosure is related to U.S. patent application Ser. No. 14/551,560 (filed 24 Nov. 2014), the entire disclosure of which is hereby incorporated by reference herein. This disclosure is related to U.S. patent application Ser. No. 14/625,852 (filed 19 Feb. 2015), the entire disclosure of which is hereby incorporated by reference herein. This disclosure is related to U.S. patent application Ser. No. 14/840,380 (filed 31 Aug. 2015), the entire disclosure of which is hereby incorporated by reference herein.

What is claimed is:

1. A computer-implemented electronic signature acquisition method comprising:
   receiving, from an intended signatory, a delegation rule that specifies a delegate having signature authority for the intended signatory;
   receiving, from a document originator, an electronic document that is to be distributed to the intended signatory as part of an electronic signature workflow, wherein the electronic document includes one or more document terms;
   determining that the delegation rule applies to the electronic document;
   sending, to the document originator, a notification that the intended signatory has delegated signature authority for the electronic document to the delegate, wherein the notification includes a request for the document originator to approve delegation of signature authority for the electronic document to the delegate;
   sending, to the delegate, instructions for assenting to the one or more document terms;
   modifying the electronic document to include an electronic signature of the delegate and a chain of delegation indicating that the intended signatory has delegated signature authority to the delegate; and
   recording audit data in an audit data repository, the audit data specifying the chain of delegation and characterizing the electronic signature of the delegate.

2. The method of claim 1, further comprising receiving, from the document originator, instructions setting forth one or more conditions that delegation of signature authority from the intended signatory to the delegate must satisfy, wherein the one or more conditions includes a prohibition on further delegation of signature authority from the delegate to another party.

3. The method of claim 1, further comprising receiving, from the intended signatory, a reason for delegation of signature authority to the delegate, wherein the notification sent to the document originator includes the reason.

4. The method of claim 1, wherein:
   the delegation rule further specifies a document characteristic; and
   determining that the delegation rule applies to the electronic document further comprises determining that the document characteristic applies to the electronic document.

5. The method of claim 1, wherein:
   the delegation rule further specifies a keyword; and
   determining that the delegation rule applies to the electronic document further comprises determining that the electronic document contains the keyword.

6. The method of claim 1, wherein determining that the delegation rule applies to the electronic document further comprises:
   sending the intended signatory initial instructions for assenting to the one or more document terms; and
   determining that a specified time period has elapsed after sending the initial instructions without receiving any reply from the intended signatory.

7. An electronic signature server system comprising a memory device and a processor that is operatively coupled to the memory device, wherein the processor is configured to execute instructions stored in the memory device that, when executed, cause the processor to carry out an electronic signature delegation process that comprises:
   receiving, from an intended signatory, parameters that define a delegation rule that specifies a delegate having signature authority for the intended signatory;
   receiving, from a document originator, metadata that identifies a document that is to be distributed to the intended signatory as part of a workflow, wherein the document includes a plurality of document terms;
   sending, to the intended signatory, first instructions for assenting to the plurality of document terms;
   receiving an autoreply notification that is sent on behalf of the intended signatory, and that is sent in response to sending the first instructions to the intended signatory;
   in response to receiving the autoreply notification, determining applicability of the delegation rule;

sending, to the document originator, a request for the document originator to approve delegation of signature authority for the document to the delegate; and sending, to the delegate, second instructions for assenting to the plurality of document terms in response to determining that the delegation rule is applicable.

8. The electronic signature system of claim 7, wherein the electronic signature delegation process further comprises:

receiving, from the intended signatory, a reason for delegation of signature authority to the delegate; and sending, to the delegate with the second instructions, the reason for delegation of signature authority.

9. The electronic signature system of claim 7, wherein the electronic signature delegation process further comprises:

parsing the autoreply notification to identify a return date for the intended signatory; and modifying the delegation rule to expire on the return date.

10. The electronic signature system of claim 7, wherein the parameters that define the delegation rule specify a first delegate having signature authority for the intended signatory during a first time period, and a second delegate having signature authority for the intended signatory during a second time period.

11. The electronic signature system of claim 7, wherein the electronic signature delegation process further comprises modifying the document to include an electronic signature of the delegate and a chain of delegation indicating that the intended signatory has delegated signature authority to the delegate.

12. The electronic signature system of claim 7, wherein the first and second instructions are functionally equivalent.

13. The electronic signature system of claim 7, wherein the electronic signature delegation process further comprises sending, to the document originator, a delegation notification that the intended signatory has delegated signature authority for the document to the delegate.

14. The electronic signature system of claim 7, wherein the electronic signature delegation process further comprises receiving, from the document originator, instructions with respect to whether the document originator must preapprove a delegation of signature authority before the delegate is sent the second instructions.

15. A computer program product encoded with instructions that, when executed by one or more processors, cause a document workflow process to be carried out, the process comprising:

receiving, from an intended signatory, a delegation rule that specifies a delegate having signature authority for the intended signatory;

receiving, from a document originator, an electronic document that is to be distributed to the intended signatory, wherein the electronic document includes one or more document terms;

determining that the delegation rule applies to the electronic document;

sending, to the document originator, a notification that the intended signatory has delegated signature authority for the electronic document to the delegate, wherein the notification includes a request for the document originator to approve delegation of signature authority for the electronic document to the delegate;

sending, to the delegate, instructions for assenting to the one or more document terms;

modifying the electronic document to include an electronic signature of the delegate; and recording audit data in an audit data repository, the audit data (a) specifying a chain of delegation indicating that the intended signatory has delegated signature authority to the delegate, and (b) characterizing the electronic signature of the delegate.

16. The computer program product of claim 15, wherein the document workflow process further comprises modifying the electronic document to include a hyperlink to the audit data stored in the audit data repository.

17. The computer program product of claim 15, wherein determining that the delegation rule applies to the electronic document further comprises:

sending the intended signatory initial instructions for assenting to the one or more document terms; and receiving an autoreply notification that is sent on behalf of the intended signatory, and that is sent in response to sending the initial instructions to the intended signatory.

18. The computer program product of claim 15, wherein:

the delegation rule further specifies one or more identified document originators; and determining that the delegation rule applies to the electronic document further comprises determining that the one or more identified document originators include the document originator.

19. The computer program product of claim 15, wherein the document workflow process further comprises receiving, from the intended signatory, a reason for delegation of signature authority to the delegate, wherein the audit data recorded in the audit data repository includes the reason.

* * * * *